United States Patent
Li et al.

(10) Patent No.: US 10,505,810 B2
(45) Date of Patent: Dec. 10, 2019

(54) DATA TRANSMISSION METHOD AND DEVICE

(71) Applicant: ZTE Corporation, Shenzhen (CN)

(72) Inventors: YU Ngok Li, Shenzhen (CN); Bo Dai, Shenzhen (CN); Feng Xie, Shenzhen (CN); Peng Hao, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 42 days.

(21) Appl. No.: 15/541,279

(22) PCT Filed: Jan. 21, 2016

(86) PCT No.: PCT/CN2016/071633
§ 371 (c)(1),
(2) Date: Jun. 30, 2017

(87) PCT Pub. No.: WO2016/107613
PCT Pub. Date: Jul. 7, 2016

(65) Prior Publication Data
US 2017/0346695 A1 Nov. 30, 2017

(30) Foreign Application Priority Data
Dec. 31, 2014 (CN) .......................... 2014 1 0856604

(51) Int. Cl.
H04L 12/24 (2006.01)
H04W 72/12 (2009.01)
(Continued)

(52) U.S. Cl.
CPC ........ *H04L 41/0893* (2013.01); *H04L 5/0037* (2013.01); *H04L 5/0058* (2013.01);
(Continued)

(58) Field of Classification Search
CPC ............. H04L 29/0638; H04L 41/0893; H04L 5/0023; H04L 5/0037; H04L 5/0058; H04L 5/0091; H04W 72/12
See application file for complete search history.

(56) References Cited

U.S. PATENT DOCUMENTS

2003/0236069 A1* 12/2003 Sakata ................. H04W 84/18
455/11.1
2011/0243066 A1* 10/2011 Nayeb Nazar .......... H04L 1/007
370/328
(Continued)

FOREIGN PATENT DOCUMENTS

CN 101729353 A 6/2010
CN 103636150 A 3/2014
(Continued)

OTHER PUBLICATIONS

International Search Report for corresponding application PCT/CN2016/071633 filed on Jan. 21, 2016; dated May 5, 2016.
(Continued)

*Primary Examiner* — Babar Sarwar
(74) *Attorney, Agent, or Firm* — Cantor Colburn LLP

(57) ABSTRACT

Provided are a data transmission method and device. The method includes that: N second-type nodes are grouped to form a third-type node, N being a positive integer more than or equal to 2; and data is transmitted in a network formed by the second-type nodes, the third-type node and a first-type node.

18 Claims, 5 Drawing Sheets

(51) Int. Cl.
*H04L 29/06* (2006.01)
*H04L 5/00* (2006.01)
(52) U.S. Cl.
CPC ........ *H04L 5/0091* (2013.01); *H04L 29/0638* (2013.01); *H04W 72/12* (2013.01); *H04L 5/0023* (2013.01)

(56) References Cited

U.S. PATENT DOCUMENTS

| | | | | |
|---|---|---|---|---|
| 2013/0028192 | A1* | 1/2013 | Cheng | H04L 1/004 370/328 |
| 2014/0003264 | A1* | 1/2014 | Shin | H04B 7/0689 370/252 |
| 2014/0119313 | A1* | 5/2014 | Yang | H04W 74/0833 370/329 |
| 2014/0126556 | A1* | 5/2014 | Tiirola | H04L 47/827 370/336 |
| 2014/0146752 | A1* | 5/2014 | Chen | H04B 15/00 370/329 |
| 2014/0177560 | A1 | 6/2014 | Guo | |
| 2014/0348110 | A1* | 11/2014 | Wang | H04L 1/0041 370/329 |
| 2016/0081078 | A1* | 3/2016 | Qin | H04W 52/146 370/252 |
| 2016/0112170 | A1* | 4/2016 | Li | H04L 25/0204 |
| 2017/0346695 | A1* | 11/2017 | Li | H04W 72/12 |

FOREIGN PATENT DOCUMENTS

| | | |
|---|---|---|
| CN | 104185261 A | 12/2014 |
| WO | 2014190859 A1 | 12/2014 |

OTHER PUBLICATIONS

European Search Report for corresponding application EP 16722879; Report dated Dec. 6, 2017.

* cited by examiner

DATA TRANSMISSION METHOD AND DEVICE

TECHNICAL FIELD

The present disclosure relates to the field of communications, and particularly to a data transmission method and device.

BACKGROUND

In a wireless communication technology, when a first-type node, such as an Evolved Universal Mobile Telecommunications System Terrestrial Radio Access Network (E-UTRAN) NodeB (eNB) sends data by virtue of multiple antennae, a data transmission rate may be increased by adopting a multicarrier transmission manner. That is, the first-type node sends different data by virtue of multiple carriers, and a second-type node, such as User Equipment (UE), also receives the data by virtue of multiple carriers. Under the condition that multiple users have services, an eNB may allocate different carrier resources to different users, and the multiple users may be scheduled and receive data under different carriers respectively. Under the condition that only one user has a service, the eNB may allocate all of the carriers to the same user, the user occupies all of physical resources allocated by an eNB side in a transmission interval, but the user is required to have a capability of processing multiple carriers, and if the user only has a capability of processing one or relatively few carriers, the user may only receive the data at one or relatively few carrier stations, and the eNB may also only send the data on one or relatively few carriers, so that the resources are wasted.

In a Long Term Evolution (LTE) standard research project, new-type carriers are introduced into some researches, and researches are made on New Carrier Types (NCTs) in release 10, researches are being made on supporting of carriers in an unlicensed frequency band in present release 13. These new-type carriers do not support backward compatibility, some users may not support these new-type carriers, including terminal of old versions or terminal without a new carrier supporting capability, and if only these terminals in a system have services at present, the eNB may only send data on relatively few carriers, so that resources of these new carriers are wasted.

Different terminals may also have different capabilities, besides a new carrier capability, such as a Multiple Input Multiple Output (MIMO) layer number capability, a modulation mode capability, an interference cancellation receiver capability, a supported maximum carrier number, maximum transmitted power and a Multimedia Broadcast Multicast Service (MBMS) capability. In a conventional art, each terminal has different capabilities according to supporting of different standard versions, or the terminals report capabilities to an eNB, and all of these capabilities of the same terminal may be applied to all carriers.

Device to Device (D2D) communication is a technology for direct communication between terminals, and its main characteristic is that: a certain device in multiple devices positioned at short distances under coverage of a network may find the other devices in a wireless manner and implement direct connection and communication between the devices. During D2D communication, a resource is shared with a cell user under control of a cell network, so that a utilization rate of a spectrum may be increased. In addition, advantages achieved by D2D communication may further include: reducing a burden of a cellular network, reducing power consumption of a battery of a mobile terminal, increasing a bit rate, improving robustness of a failure of a network infrastructure and the like. Novel small-scale point-to-point data service may also be supported, and data may be forwarded between the devices by virtue of the D2D communication technology.

By a D2D communication technology, it is also considered in the conventional art that a terminal forwards data for another terminal as a relay. In addition, multiple receiving nodes and a sender may also form a virtual MIMO network for data transmission by virtue of a virtual MIMO method. However, there is yet no solution that multiple nodes or multiple terminals form a virtual node (third-type node) for carrier sharing as well as solution in which nodes on a shared carrier support different capabilities in the conventional art.

For the problem in a related technology that multiple nodes may not share a carrier, there is yet no effective solution.

SUMMARY

The embodiments of the present disclosure provide a data transmission method and device, so as to at least solve the problem in the related technology that multiple nodes may not share a carrier.

According to one aspect of the present disclosure, a data transmission method is provided, which may include that: N second-type nodes are grouped to form a third-type node, N being a positive integer more than or equal to 2; and data is transmitted in a network formed by the second-type nodes, the third-type node and a first-type node.

In some embodiments, the step that the N second-type nodes are grouped to form the third-type node may include that: the N second-type nodes are grouped to form the third-type node with a multicarrier capability, and the N second-type nodes may have capabilities of $M_1, M_2, \ldots, M_N$ carriers respectively, the third-type node may have a capability of less than or equal to $M=M_1+M_2+ \ldots +M_N$ carriers, $M_1, M_2, \ldots, M_N$ may be positive integers more than or equal to 1, and M may be a positive integer more than or equal to 2.

In some embodiments, the step that the N second-type nodes are grouped to form the third-type node may include that: the N second-type nodes are aggregated to form the third-type node by taking a component carrier as a unit respectively.

In some embodiments, the first-type node may be formed by K nodes, and the K nodes may be aggregated to form the first-type node by taking a component carrier as a unit respectively, and K may be a positive integer more than or equal to 1.

In some embodiments, the N second-type nodes may be autonomously aggregated to form the third-type node, the third-type node may be a compound node, the third-type node may report a type of the compound node to the first-type node, and the first-type node may perform data scheduling for the type of the compound node, and the type of the compound node may include at least one of: an aggregated node Identity (ID), a compound node type capability indication, an aggregation state and aggregation completion indication information.

In some embodiments, the N second-type nodes may be aggregated to form the third-type node according to indication information received from the first-type node.

In some embodiments, after the N second-type nodes are aggregated to form the third-type node according to the indication information received from the first-type node, the method may include that: feedback information is sent to the first-type node, and the feedback information may include at least one of: the aggregated node ID, a compound node type capability, the aggregation state and the aggregation completion indication information; and the first-type node performs data scheduling according to the received feedback information.

In some embodiments, the step that the data is transmitted in the network formed by the second-type nodes, the third-type node and the first-type node may include that: Nr second-type nodes receive first data sent through M carriers from one or more first-type nodes; and the Nr second-type nodes forward the first data to Nd second-type nodes in the third-type node, and Nr may be a positive integer more than or equal to 1 and less than or equal to N, and Nd may be a positive integer more than or equal to 1 and less than or equal to N.

In some embodiments, the step that the data is transmitted in the network formed by the second-type nodes, the third-type node and the first-type node may include that: the Nd second-type nodes in the third-type node send second data to the Nr second-type nodes in the third-type node; and the Nr second-type nodes send the second data to the one or more first-type nodes through the M carriers, and Nr may be a positive integer more than or equal to 1 and less than or equal to N, and Nd may be a positive integer more than or equal to 1 and less than or equal to N.

In some embodiments, the step that the data is transmitted in the network formed by the second-type nodes, the third-type node and the first-type node may include that: the Nr second-type nodes with a new-type carrier capability receive third data sent through new-type carriers of the M carriers from the one or more first-type nodes; and the Nr second-type nodes forward the third data to the Nd second-type nodes in the third-type node, and the Nd second-type nodes may not have the new-type carrier capability, Nr may be a positive integer more than or equal to 1 and less than or equal to N, and Nd may be a positive integer more than or equal to 1 and less than or equal to N.

In some embodiments, the step that the data is transmitted in the network formed by the second-type nodes, the third-type node and the first-type node may include that: the Nd second-type nodes in the third-type node send fourth data to the Nr second-type nodes with the new-type carrier capability in the third-type node; and the Nr second-type nodes send the fourth data to the one or more first-type nodes through the new-type carriers of the M carriers, and the Nd second-type nodes may not have the new-type carrier capability, Nr may be a positive integer more than or equal to 1 and less than or equal to N, and Nd may be a positive integer more than or equal to 1 and less than or equal to N.

In some embodiments, the new-type carriers may include carriers of an unlicensed frequency band and carriers of an NCT.

In some embodiments, the step that the data is transmitted in the network formed by the second-type nodes, the third-type node and the first-type node may include that: the Nr second-type nodes in the third-type node receive first control information from the one or more first-type nodes; the Nr second-type nodes forward part or all of the first control information to the Nd second-type nodes in the third-type node; the Nd second-type nodes acquire first specified information on the basis of the first control information; and the Nd second-type nodes receive and send service data with the one or more first-type nodes through the M carriers on the basis of the first control information, and Nr may be a positive integer more than or equal to 1 and less than or equal to N, and Nd may be a positive integer more than or equal to 1 and less than or equal to N.

In some embodiments, the Nd second-type nodes may have the new-type carrier capability and receive and send the service data with the one or more first-type nodes through the new-type carriers of the M carriers.

In some embodiments, the first control information may include at least one of the following information: channel scheduling information, data modulation and coding information and channel state information.

In some embodiments, the step that the data is transmitted in the network formed by the second-type nodes, the third-type node and the first-type node may include that: the Nr second-type nodes in the third-type node receive second control information from the Nd second-type nodes; the Nr second-type nodes forward part or all of the second control information to the one or more first-type nodes; and the Nd second-type nodes receive and send the service data with the one or more first-type nodes through the M carriers on the basis of the second control information, and Nr may be a positive integer more than or equal to 1 and less than or equal to N, and Nd may be a positive integer more than or equal to 1 and less than or equal to N.

In some embodiments, the Nd second-type nodes may have the new-type carrier capability and receive and send the service data with the one or more first-type nodes through the new-type carriers of the M carriers.

In some embodiments, the second control information may include at least one of the following information: the channel scheduling information, the data modulation and coding information and the channel state information.

In some embodiments, the step that the data is transmitted in the network formed by the second-type nodes, the third-type node and the first-type node may include that: the Nr second-type nodes receive specified-type data sent through the M carriers from the one or more first-type nodes; and the Nr second-type nodes forward the specified-type data to the Nd second-type nodes in the third-type node, and Nr may be a positive integer more than or equal to 1 and less than or equal to N, and Nd may be a positive integer more than or equal to 1 and less than or equal to N.

In some embodiments, the specified-type data may include at least one of the following information: MBMS related information, positioning related information and control information.

In some embodiments, the carrier capability may include at least one of: a new-type carrier capability, a MIMO layer number, a modulation mode, an interference cancellation capability, a supported carrier number, maximum transmitted power, a Radio Access Technology (RAT) capability and a dual-connectivity/multi-connectivity capability. According to another aspect of the present disclosure, a data transmission method is further provided, which may include that: N second-type nodes are grouped to form a third-type node, N being a positive integer more than or equal to 2; and the second-type nodes perform data transmission with a first-type node through the third-type node.

According to another aspect of the present disclosure, a data transmission method is further provided, which may include that: a first-type node performs data transmission with a second-type node through a third-type node, and the third-type node may be formed by N second-type nodes, and N may be a positive integer more than or equal to 2.

According to another aspect of the present disclosure, a data transmission device is further provided, which may include: a forming module, configured to group N second-type nodes to form a third-type node, N being a positive integer more than or equal to 2; and a transmission module, configured to transmit data in a network formed by the second-type nodes, the third-type node and a first-type node.

In some embodiments, the forming module may further be configured to group the N second-type nodes to form the third-type node with a multicarrier capability, and the N second-type nodes may have capabilities of $M_1, M_2, \ldots, M_N$ carriers respectively, the third-type node may have a capability of less than or equal to $M=M_1+M_2+\ldots+M_N$ carriers, $M_1, M_2, \ldots, M_N$ may be positive integers more than or equal to 1, and M may be a positive integer more than or equal to 2.

In some embodiments, the forming module may further be configured to aggregate the N second-type nodes to form the third-type node by taking a component carrier as a unit respectively.

According to another aspect of the present disclosure, a data transmission device is further provided, which may be applied to a second-type node and include: a forming module, configured to group N second-type nodes to form a third-type node, N being a positive integer more than or equal to 2; and a transmission module, configured to perform data transmission with a first-type node through the third-type node.

According to another aspect of the present disclosure, a data transmission device is further provided, which may be applied to a first-type node and include a transmission module, configured to perform data transmission with a second-type node through a third-type node, and the third-type node may be formed by N second-type nodes, and N may be a positive integer more than or equal to 2.

According to the above embodiments of present disclosure, the N second-type nodes are grouped to form the third-type node, N being a positive integer more than or equal to 2; and the data is transmitted in the network formed by the second-type nodes, the third-type node and the first-type node. The problem that multiple nodes may not share a carrier is solved, carrier sharing between devices is implemented, resource waste is reduced, and overall network transmission performance is improved.

BRIEF DESCRIPTION OF THE DRAWINGS

The drawings described here are adopted to provide a further understanding to the present disclosure, and form a part of the present disclosure. Schematic embodiments of the present disclosure and descriptions thereof are adopted to explain the present disclosure.

DETAILED DESCRIPTION OF THE EMBODIMENTS

The present disclosure will be described below in detail with reference to the drawings and embodiments. It is important to note that the embodiments in the present disclosure and characteristics in the embodiments may be combined under the condition of no conflicts.

Figure 1:
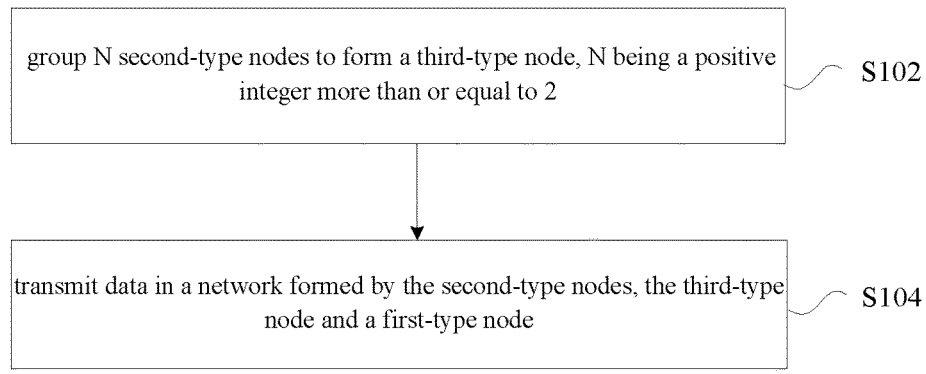
FIG. 1 is a flowchart of a data transmission method according to an embodiment of the present disclosure.

An embodiment provides a data transmission method. FIG. 1 is a flowchart of a data transmission method according to an embodiment of the present disclosure. As shown in FIG. 1, the flow includes the following steps S102 to S104.

At Step S102, N second-type nodes are grouped to form a third-type node, N being a positive integer more than or equal to 2.

At Step S104, data is transmitted in a network formed by the second-type nodes, the third-type node and a first-type node.

By the above steps, multiple second-type nodes are grouped to form the third-type node, and the second-type nodes complete data transmission with the first-type node through the third-type node. Compared with the conventional art where resources of new carriers are wasted because some users may not support some new-type carriers and an eNB may send data on only one carrier if only these terminals in a system have services at present and there is yet no solution that multiple nodes share a carrier at present, the steps solve the problem that multiple nodes may not share a carrier, implement carrier sharing between devices, reduce resource waste and improve overall network transmission performance.

Grouping of the N second-type nodes for formation of the third-type node is involved in Step S102, and in an exemplary embodiment, the step that the N second-type nodes are grouped to form the third-type node includes that: the N second-type nodes are grouped to form the third-type node with a multicarrier capability, and the N second-type nodes have capabilities of $M_1, M_2, \ldots, M_N$ carriers respectively, the third-type node has a capability of less than or equal to $M=M_1+M_2+\ldots+M_N$ carriers, $M_1, M_2, \ldots, M_N$ are positive integers more than or equal to 1, and M is a positive integer more than or equal to 2.

In an exemplary embodiment, the N second-type nodes are aggregated to form the third-type node by taking a component carrier as a unit respectively, thereby implementing grouping of the N second-type nodes for formation of the third-type node.

In an exemplary embodiment, the first-type node is formed by K nodes, and the K nodes are aggregated to form the first-type node by taking a component carrier as a unit respectively, and K is a positive integer more than or equal to 1.

Grouping of the N second-type nodes for formation of the third-type node is involved in Step S102, and in an exemplary embodiment, the N second-type nodes are autonomously aggregated to form the third-type node, the third-type node is a compound node, the third-type node reports a type of the compound node to the first-type node, and the first-type node performs data scheduling for the type of the compound node, and the type of the compound node includes at least one of: an aggregated node ID, a compound node type capability indication, an aggregation state and aggregation completion indication information. In another exemplary embodiment, the N second-type nodes are aggregated to form the third-type node according to indication information received from the first-type node. In an exemplary embodiment, after the N second-type nodes are aggregated to form the third-type node according to the indication information received from the first-type node, feedback information is sent to the first-type node, and the feedback information includes at least one of: the aggregated node ID, a compound node type capability, the aggregation state and the aggregation completion indication information; and the first-type node performs data scheduling according to the received feedback information.

Transmission of data in the network formed by the second-type nodes, the third-type node and the first-type node is involved in Step S104. In an exemplary embodiment, Nr second-type nodes receive first data sent through M carriers from one or more first-type nodes, and the Nr second-type nodes forward the first data to Nd second-type nodes in the third-type node, and Nr is a positive integer more than or equal to 1 and less than or equal to N, and Nd is a positive integer more than or equal to 1 and less than or equal to N. Therefore, transmission of the data from the first-type node to the Nd second-type nodes is implemented through the Nr second-type nodes.

In another exemplary embodiment, the Nd second-type nodes in the third-type node send second data to the Nr second-type nodes in the third-type node, and the Nr second-type nodes send the second data to the one or more first-type nodes through the M carriers. Therefore, transmission of the data from the Nd second-type nodes to the first-type node is implemented through the Nr second-type nodes.

Transmission of data in the network formed by the second-type nodes, the third-type node and the first-type node is involved in Step S104, and in an exemplary embodiment, the Nr second-type nodes with a new-type carrier capability receive third data sent through M new-type carriers from the one or more first-type nodes, and the Nr second-type nodes forward the third data to the Nd second-type nodes in the third-type node, and the Nd second-type nodes do not have the new-type carrier capability. Therefore, transmission of the data from the first-type node to the Nd second-type nodes is implemented through the Nr second-type nodes.

In an exemplary embodiment, the new-type carriers include carriers of an unlicensed frequency band and carriers of an NCT.

In an exemplary embodiment, the Nd second-type nodes in the third-type node send fourth data to the Nr second-type nodes with the new-type carrier capability in the third-type node, and the Nr second-type nodes send the fourth data to the one or more first-type nodes through the M new-type carriers, and the Nd second-type nodes do not have the new-type carrier capability. Therefore, transmission of the data from the Nd second-type nodes to the first-type node is implemented through the Nr second-type nodes.

Transmission of data in the network formed by the second-type nodes, the third-type node and the first-type node is involved in Step S104, and in an exemplary embodiment, the Nr second-type nodes in the third-type node receive first control information from the one or more first-type nodes, the Nr second-type nodes forward part or all of the first control information to the Nd second-type nodes in the third-type node, the Nd second-type nodes acquire first specified information on the basis of the first control information, and the Nd second-type nodes receive and send service data with the one or more first-type nodes through the M carriers on the basis of the first control information. Therefore, transmission of the control information between the first-type node and the Nd second-type nodes is implemented through the Nr second-type nodes. Under such a condition, in an exemplary embodiment, the Nd second-type nodes have the new-type carrier capability and receive and send the service data with the one or more first-type nodes through new-type carriers of the M carriers.

In an exemplary embodiment, the first control information includes at least one of the following information: channel scheduling information, data modulation and coding information and channel state information.

Transmission of data in the network formed by the second-type nodes, the third-type node and the first-type node is involved in Step S104, and in an exemplary embodiment, the Nr second-type nodes in the third-type node receive second control information from the Nd second-type nodes, the Nr second-type nodes forward part or all of the second control information to the one or more first-type nodes, and the Nd second-type nodes receive and send the service data with the one or more first-type nodes through the M carriers on the basis of the second control information. Under such a condition, in an exemplary embodiment, the Nd second-type nodes have the new-type carrier capability and receive and send the service data with the one or more first-type nodes through the new-type carriers of the M carriers.

In an exemplary embodiment, the second control information includes at least one of the following information: the channel scheduling information, the data modulation and coding information and the channel state information.

Transmission of data in the network formed by the second-type nodes, the third-type node and the first-type node is involved in Step S104, and in an exemplary embodiment, the Nr second-type nodes receive specified-type data sent through the M carriers from the one or more first-type nodes, and the Nr second-type nodes forward the specified-type data to the Nd second-type nodes in the third-type node, and Nr is a positive integer more than or equal to 1 and less than or equal to N, and Nd is a positive integer more than or equal to 1 and less than or equal to N. In another exemplary embodiment, the specified-type data may be MBMS related information, may also be positioning related information, and may further be control information.

In an exemplary embodiment, the carrier capability includes at least one of: a new-type carrier capability, a MIMO layer number, a modulation mode, an interference cancellation capability, a supported carrier number, maximum transmitted power, a RAT capability and a dual-connectivity/multi-connectivity capability.

An embodiment further provides a data transmission device. The device is configured to implement the above-mentioned embodiment and preferred implementation modes, and what has been described will not be elaborated.

For example, term "module", used below, may be a combination of software and/or hardware capable of realizing a preset function. Although the device described in the following embodiment is preferably implemented with software, implementation with hardware or a combination of the software and the hardware is also possible and conceivable.

Figure 2:
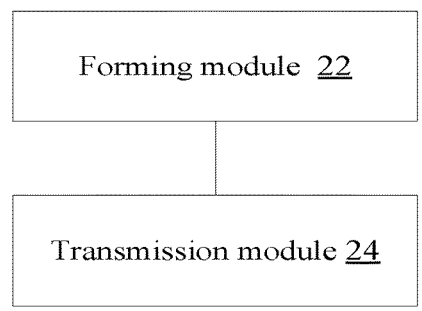
FIG. 2 is a structure block diagram of a data transmission device according to an embodiment of the present disclosure.

FIG. 2 is a structure block diagram of a data transmission device according to an embodiment of the present disclosure. As shown in FIG. 2, the device includes: a forming module 22, configured to group N second-type nodes to form a third-type node, N being a positive integer more than or equal to 2; and a transmission module 24, configured to transmit data in a network formed by the second-type nodes, the third-type node and a first-type node.

In some embodiments, the forming module 22 is further configured to group the N second-type nodes to form the third-type node with a multicarrier capability, and the N second-type nodes have capabilities of $M_1, M_2, \ldots, M_N$ carriers respectively, the third-type node has a capability of less than or equal to $M=M_1+M_2+ \ldots +M_N$ carriers, $M_1, M_2, \ldots, M_N$ are positive integers more than or equal to 1, and M is a positive integer more than or equal to 2.

In some embodiments, the forming module 22 is further configured to aggregate the N second-type nodes to form the third-type node by taking a component carrier as a unit respectively.

Figure 3:
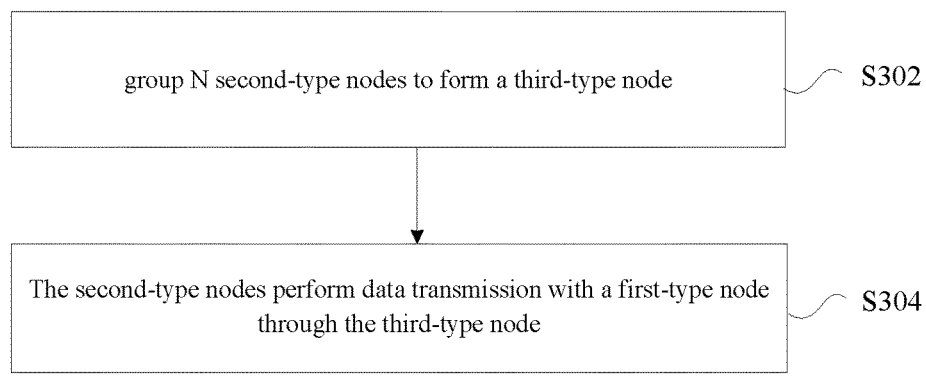
FIG. 3 is a flowchart of a data transmission method according to an embodiment of the present disclosure.

Another embodiment provides another data transmission method. FIG. 3 is a flowchart of a data transmission method according to an embodiment of the present disclosure. As shown in FIG. 3, the flow includes the following steps S302 to S304.

At Step S302, N second-type nodes are grouped to form a third-type node, N being a positive integer more than or equal to 2.

At Step S304, the second-type nodes perform data transmission with a first-type node through the third-type node.

By the steps, multiple second-type nodes are grouped to form the third-type node, and the second-type nodes complete data transmission with the first-type node through the third-type node. Compared with the conventional art where resources of new carriers are wasted because some users may not support some new-type carriers and an eNB may send data on only one carrier if only these terminals in a system have services at present and there is yet no solution that multiple nodes share a carrier at present, the steps solve the problem that multiple nodes may not share a carrier, implement carrier sharing between devices, reduce resource waste and improve overall network transmission performance.

Figure 4:
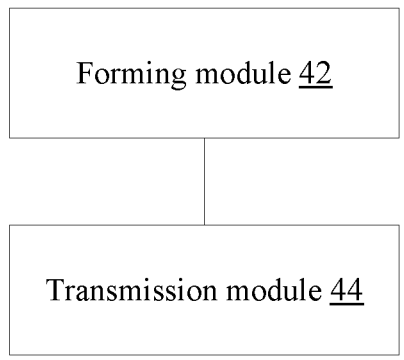
FIG. 4 is a structure block diagram of a data transmission device according to an embodiment of the present disclosure.

FIG. 4 is a structure block diagram of a data transmission device according to an embodiment of the present disclosure. The device is applied to a second-type node, and as shown in FIG. 4, includes: a forming module 42, configured to group N second-type nodes to form a third-type node, N being a positive integer more than or equal to 2; and a transmission module 44, configured to perform data transmission with a first-type node through the third-type node.

Figure 5:
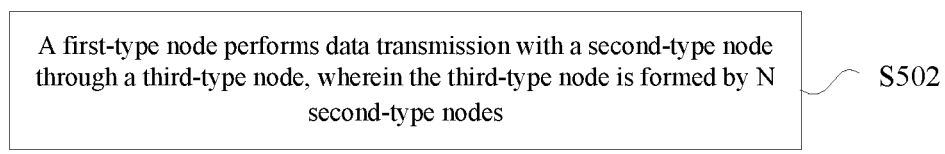
FIG. 5 is another flowchart of a data transmission method according to an embodiment of the present disclosure.

Another embodiment provides another data transmission method. FIG. 5 is another flowchart of a data transmission method according to an embodiment of the present disclosure. As shown in FIG. 5, the flow includes the following step S502:

At Step S502, a first-type node performs data transmission with a second-type node through a third-type node, and the third-type node is formed by N second-type nodes, and N is a positive integer more than or equal to 2.

By the steps, multiple second-type nodes are grouped to form the third-type node, and the second-type nodes complete data transmission with the first-type node through the third-type node. Compared with the conventional art where resources of new carriers are wasted because some users may not support some new-type carriers and an eNB may send data on only one carrier if only these terminals in a system have services at present and there is yet no solution that multiple nodes share a carrier at present, the steps solve the problem that multiple nodes may not share a carrier, implement carrier sharing between devices, reduce resource waste and improve overall network transmission performance.

Figure 6:
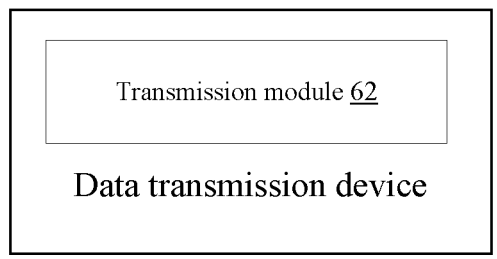
FIG. 6 is another structure block diagram of a data transmission device according to an embodiment of the present disclosure.

FIG. 6 is another structure block diagram of a data transmission device according to an embodiment of the present disclosure. The device is applied to a first-type node. As shown in FIG. 6, the device includes: a transmission module 62, configured to perform data transmission with a second-type node through a third-type node, and the third-type node is formed by N second-type nodes, and N is a positive integer more than or equal to 2.

It is important to note that each module may be implemented through software or hardware. The latter condition may be implemented in, but not limited to, the following manner: each module is located in the same processor; or, each module is located in a first processor, a second processor, a third processor . . . respectively.

For the problem existing in the related technology, descriptions will be made below with reference to an exemplary embodiment, and the following exemplary embodiment combines the abovementioned exemplary embodiments and optional implementation modes thereof.

Descriptions will be made below under the condition that a first-type node is an eNB and a second-type node is a terminal.

The exemplary embodiment provides a data transmission method, device and system for a virtual multicarrier system, which may implement carrier sharing between devices, reduce resource waste and improve overall network transmission performance.

A data transmission method for a virtual multicarrier system includes that: N second-type nodes are grouped to form a third-type node with a multicarrier capability, and the N second-type nodes have capabilities of $M_1, M_2, \ldots, M_N$ carriers respectively, the third-type node has a capability of less than or equal to $M=M_1+M_2+ \ldots +M_N$ carriers, $M_1, M_2, \ldots, M_N$ are positive integers more than or equal to 1, and M is a positive integer more than or equal to 2.

In some embodiments, the third-type node is an aggregation node, and different nodes are aggregated by taking a component carrier as a unit, thereby forming a compound node.

In some embodiments, different component carriers in the third-type node have different capabilities, and the capabilities of the component carriers include, but not limited to, the followings: a new-type carrier capability, including carriers of an unlicensed frequency band and an NCT; a MIMO layer number; a modulation mode-256 Quadrature Amplitude Modulation (QAM); an interference cancellation capability; a supported maximum carrier number and maximum transmitted power; a RAT capability, which may include Wireless Fidelity (WiFi), General Packet Radio Service (GPRS), Wideband Code Division Multiple Access (WCDMA) and the like; and a dual-connectivity/multi-connectivity capability.

In some embodiments, the capability of each component carrier in the third-type node is independently configured according to each component carrier or component carriers of each group respectively.

In an exemplary embodiment, the method further includes that:

the N second-type nodes are grouped to form the third-type node with the multicarrier capability, and Nr second-type nodes receive data sent on M carriers from one or more first-type nodes; and the Nr second-type nodes forward the data received from the first-type nodes to Nd second-type nodes in the third-type node, and Nr is a positive integer more than or equal to 1 and less than or equal to N, and Nd is a positive integer more than or equal to 1 and less than or equal to N.

In an exemplary embodiment, the method further includes that:

the N second-type nodes are grouped to form the third-type node with the multicarrier capability, the Nd second-type nodes in the third-type node send data to the Nr second-type nodes in the third-type node, and the Nr second-type nodes send the data to the one or more first-type nodes on the M carriers.

In an exemplary embodiment, the method further includes that: the N second-type nodes are grouped to form the third-type node with the multicarrier capability, and the Nr second-type nodes with a new-type carrier capability receive data sent on M new-type carriers from the one or more first-type nodes, the Nr second-type nodes forward the data received from the first-type nodes to the Nd second-type nodes in the third-type node, and the Nd second-type nodes do not have the new-type carrier capability.

In some embodiments, the new-type carriers include the carriers of the unlicensed frequency band and the NCT.

In an exemplary embodiment, the method further includes: the N second-type nodes are grouped to form the third-type node with the multicarrier capability, the Nd second-type nodes in the third-type node send data to the Nr second-type nodes with the new-type carrier capability in the third-type node, and the Nr second-type nodes send the data to the one or more first-type nodes on the M new-type carriers, and the Nd second-type nodes do not have the new-type carrier capability.

In an exemplary embodiment, the method further includes: the N second-type nodes are grouped to form the third-type node with the multicarrier capability, the Nr second-type nodes in the third-type node receive control information from the one or more first-type nodes, and the Nr second-type nodes forward part or all of the related control information to the Nd second-type nodes in the third-type node; and the Nd second-type nodes acquire related data information on the basis of the control information, and perform data sending and receiving with the one or more first-type nodes on the M carriers.

In some embodiments, the Nd second-type nodes have the new-type carrier capability, and perform data sending and receiving on the M new-type carriers.

In some embodiments, the control information includes channel scheduling information, data modulation and coding information and channel state information.

In an exemplary embodiment, the method further includes: the N second-type nodes are grouped to form the third-type node with the multicarrier capability, the Nr second-type nodes in the third-type node receive control information from the Nd second-type nodes, and the Nr second-type nodes forward part or all of the related control information to the one or more first-type nodes; and the Nd second-type nodes acquire related data information on the basis of the control information, and perform data sending and receiving with the one or more first-type nodes on the M carriers.

In some embodiments, the Nd second-type nodes have the new-type carrier capability, and perform data sending and receiving on the M new-type carriers.

In some embodiments, the control information includes the channel scheduling information, the data modulation and coding information and the channel state information.

In an exemplary embodiment, the method further includes: the N second-type nodes are grouped to form the third-type node with the multicarrier capability, the Nr second-type nodes in the third-type node receives the control information from the Nd second-type nodes, and the Nr second-type nodes forward part or all of the related control information to the one or more first-type nodes; and the Nd second-type nodes acquire related data information on the basis of the control information, and perform data sending and receiving with the one or more first-type nodes on the M carriers.

In some embodiments, the Nd second-type nodes have the new-type carrier capability, and perform data sending and receiving on the M new-type carriers.

In some embodiments, the control information includes the channel scheduling information, the data modulation and coding information and the channel state information.

In the exemplary embodiment, the first-type node includes, but not limited to: various wireless communication devices such as a macro eNB, a micro eNB, a small cell and a wireless access point. The second-type node includes, but not limited to: various terminals such as a data card, a mobile phone, a notebook computer, a personal computer, a tablet computer, a personal digital assistant and Bluetooth and various wireless communication devices such as a small cell, a micro eNB, a relay, a remote unit and a wireless access point.

Embodiment One

Figure 7:
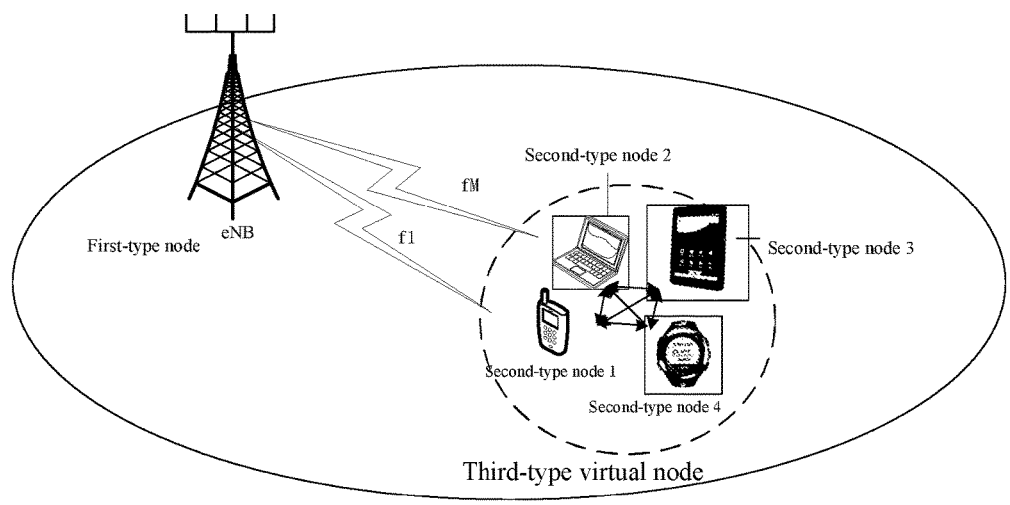
FIG. 7 is a schematic diagram of a data transmission method according to an embodiment of the present disclosure.

FIG. 7 is a schematic diagram of a data transmission method according to an embodiment of the present disclosure. As shown in FIG. 7, N (N=4) second-type nodes are grouped to form a third-type virtual node with a multicarrier capability, and the N second-type nodes have capabilities of $M_1, M_2, \ldots, M_N$ carriers respectively, and the third-type node has a capability of less than or equal to M= $M_1+M_2+ \ldots +M_N$ carriers.

In some embodiments, the third-type virtual node is an aggregation node, and different nodes are aggregated by taking a component carrier as a unit, thereby forming a compound node, for example: carrier capability enhancement, processing capability enhancement and connection solution enhancement.

Embodiment Two

Figure 8:
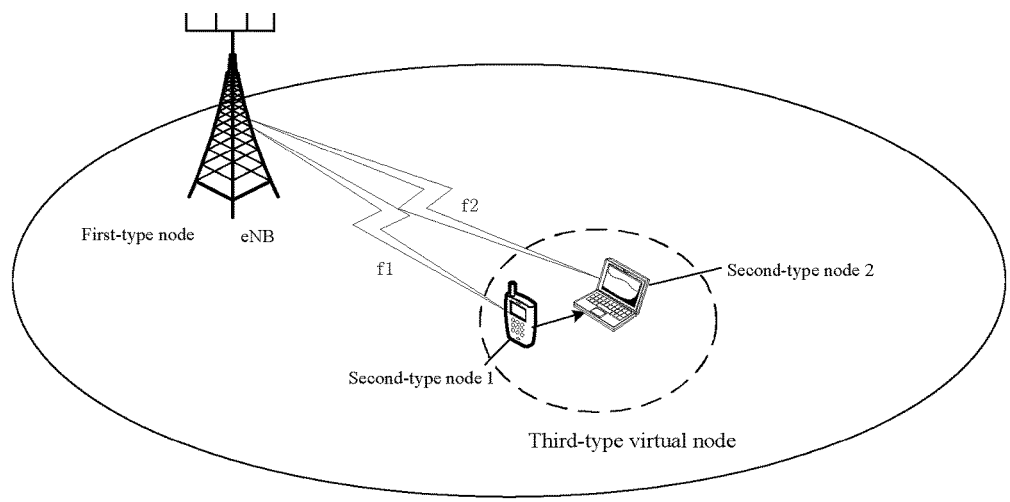
FIG. 8 is a schematic diagram of a data transmission method according to an embodiment of the present disclosure.

FIG. 8 is a schematic diagram of a data transmission method according to an embodiment of the present disclosure. As shown in FIG. 8, N (N=2) second-type nodes are grouped to form a third-type virtual node with a multicarrier capability, the second-type node 1 and the second-type node 2 having a capability of one carrier ($M_1=M_2=1$) respectively, and the second-type node 1 and the second-type node 2 receive data sent on M (M=2) carriers from a first-type node;

and the second-type node 1 forwards the data received from the first-type node to the second-type node 2 in the third-type node.

Data transmission between the second-type node 1 and the second-type node 2 may be implemented in a wireless communication or wired communication manner.

Embodiment Three

Figure 9:
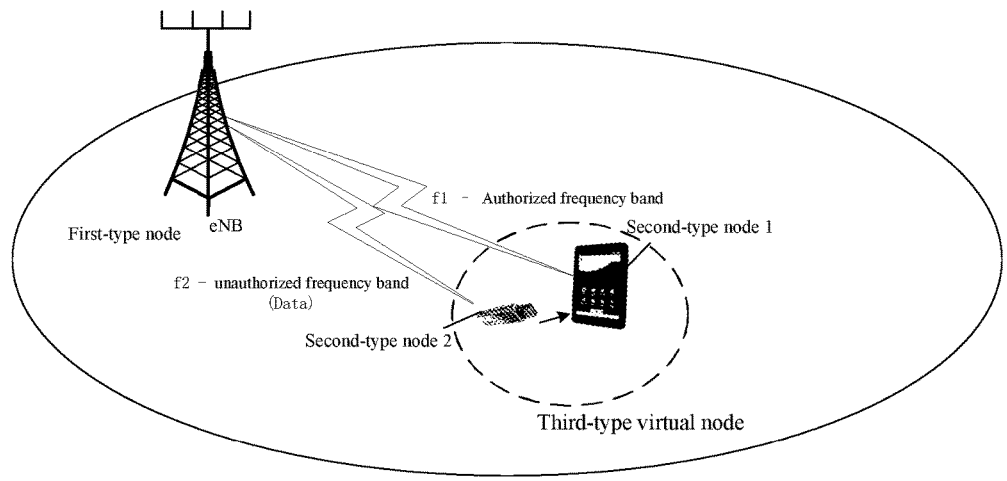
FIG. 9 is another schematic diagram of a data transmission method according to an embodiment of the present disclosure.

FIG. 9 is another schematic diagram of a data transmission method according to an embodiment of the present disclosure. As shown in FIG. 9, N (N=2) second-type nodes are grouped to form a third-type virtual node with a multicarrier capability, and the second-type node 2 with a new-type carrier capability receives data sent on a new-type carrier from one or more first-type nodes; and the second-type node 2 forwards the data received from the first-type nodes to the second-type node 1 in the third-type node.

Data transmission between the second-type node 1 and the second-type node 2 may be implemented in a wireless communication or wired communication manner.

Embodiment Four

Figure 10:
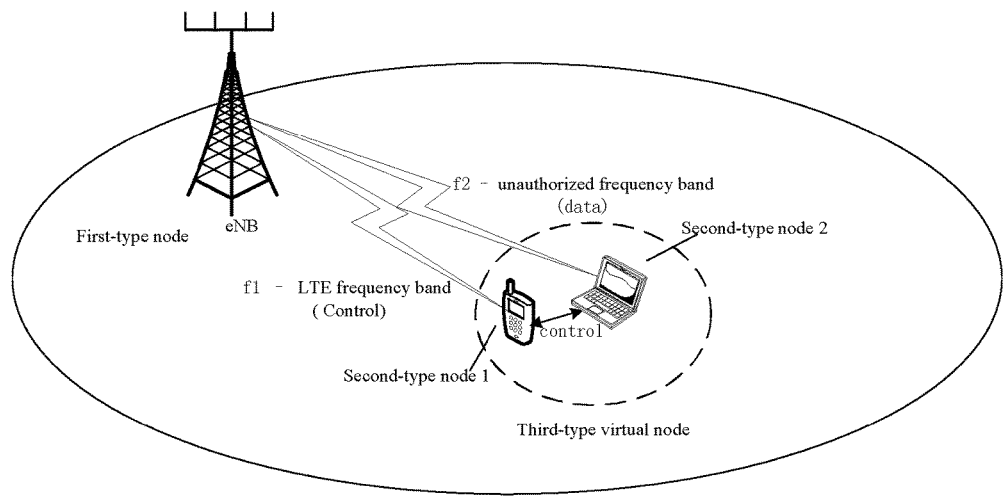
FIG. 10 is another schematic diagram of a data transmission method according to an embodiment of the present disclosure.

FIG. 10 is another schematic diagram of a data transmission method according to an embodiment of the present disclosure. As shown in FIG. 10, N (N=2) second-type nodes are grouped to form a third-type virtual node with a multicarrier capability, the second-type node 1 in the third-type node receives control information from one or more first-type nodes, and the second-type node 1 forwards part or all of the related control information to the second-type node 2 in the third-type node; and the second-type node 2 acquires related data information on the basis of the control information, and performs data sending and receiving with the one or more first-type nodes on M carriers.

In some embodiments, the second-type node 2 has a new-type carrier capability, and performs data sending and receiving on M new-type carriers.

Data transmission between the second-type node 1 and the second-type node 2 may be implemented in a wireless communication or wired communication manner.

Embodiment Five

FIG. 8 is a schematic diagram of a data transmission method according to an embodiment of the present disclosure. As shown in FIG. 8, N (N=2) second-type nodes are grouped to form a third-type virtual node with a multicarrier capability, the second-type node 1 and the second-type node 2 having a capability of one carrier ($M_1=M_2=1$) respectively, and the second-type node 1 sends data to the second-type node 2 in the third-type node; and the third-type node sends the data to one or more first-type nodes on (M=2) carriers.

Data transmission between the second-type node 1 and the second-type node 2 may be implemented in a wireless communication or wired communication manner.

Embodiment Six

Figure 11:
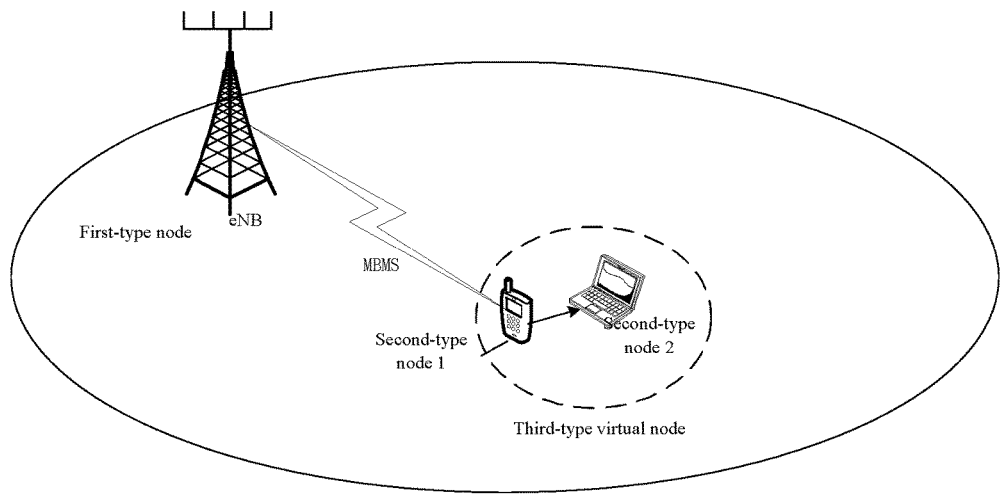
FIG. 11 is another schematic diagram of a data transmission method according to an embodiment of the present disclosure.

FIG. 11 is another schematic diagram of a data transmission method according to an embodiment of the present disclosure. As shown in FIG. 11, N (N=2) second-type nodes are grouped to form a third-type virtual node with a multicarrier capability, and Nr second-type nodes receive first-type data sent on M carriers from one or more first-type nodes; and the Nr second-type nodes forward the received first-type data sent by the first-type nodes to Nd second-type nodes in the third-type node, Nr being a positive integer more than or equal to 1 and less than or equal to N and Nd being a positive integer more than or equal to 1 and less than or equal to N.

Furthermore, the first-type data includes at least one of: MBMS related information, positioning related information and control information.

A multifunctional terminal is implemented by aggregation, so that a terminal originally without such a receiving function has a specific function. For example, a terminal supports an MBMS function, another terminal does not support, and after the two terminals are aggregated, the terminal which does not support the MBMS function may also receive MBMS data. Therefore, transmission of a multicast service by unicast is implemented.

Similarly, after such aggregation, a dual-connectivity function and even multi-connectivity and positioning enhancement may also be supported.

Embodiment Seven

Figure 12:
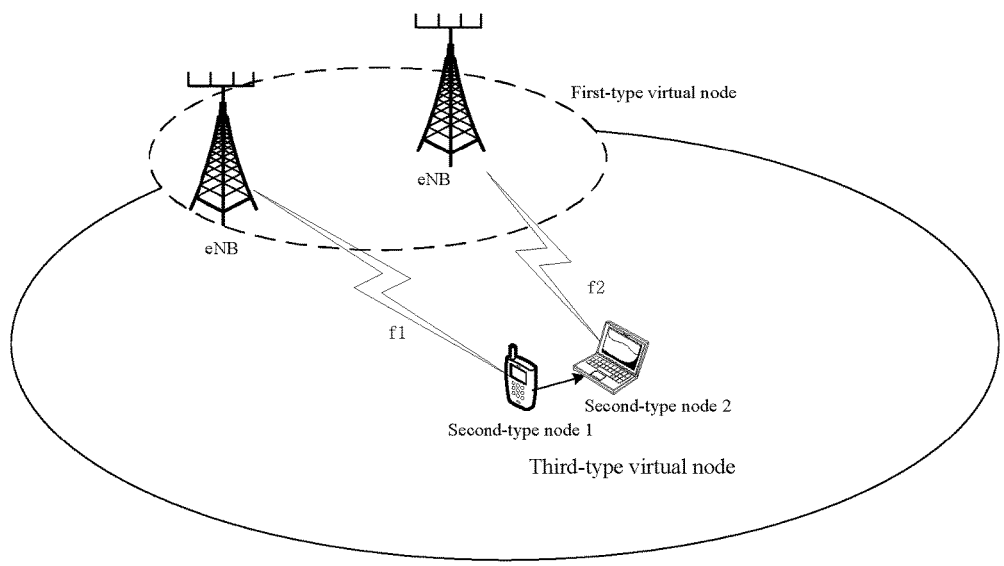
FIG. 12 is another schematic diagram of a data transmission method according to an embodiment of the present disclosure.

FIG. 12 is another schematic diagram of a data transmission method according to an embodiment of the present disclosure. As shown in FIG. 12, K nodes are grouped to form a first-type virtual node, and have capabilities of $M_1$, $M_2$, . . . , $M_N$ carriers, N (N=2) second-type nodes are grouped to form a third-type virtual node with a multicarrier capability, the N second-type nodes have the capabilities of $M_1$, $M_2$, . . . , $M_N$ carriers respectively, and the third-type node is a node with a capability of $M=M_1+M_2+ \ldots +M_N$ carriers.

In some embodiments, the third-type virtual node is an aggregation node, and different nodes are aggregated by taking a component carrier as a unit, thereby forming a compound node, for example: carrier capability enhancement, processing capability enhancement and connection solution enhancement.

From the above, according to the data transmission method and device for the virtual multicarrier system provided by the present disclosure, a multifunctional terminal is implemented by aggregation, so that a terminal originally without such a receiving function has a specific function. For example, a terminal supports an MBMS function, another terminal does not support, and after the two terminals are aggregated, the terminal which does not support the MBMS function may also receive MBMS data. Therefore, transmission of a multicast service by unicast is implemented. Similarly, after such aggregation, a dual-connectivity function and even multi-connectivity and positioning enhancement may also be supported. Carrier sharing between devices is implemented, resource waste is reduced, and overall network transmission performance is improved.

In another embodiment, software is further provided, which is configured to execute the technical solutions described in the abovementioned embodiments and preferred implementation modes.

In another embodiment, a storage medium is further provided, in which the abovementioned software is stored, the storage medium including, but not limited to: an optical disk, a floppy disk, a hard disk, an erasable memory and the like.

Note that those skilled in the art should know that each module or each step of the present disclosure may be implemented by a universal computing device, and the modules or steps may be concentrated on a single computing device or distributed on a network formed by a plurality of computing devices, and may In some embodiments be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the present disclosure is not limited to any specific hardware and software combination.

The above is only the preferred embodiment of the present disclosure and not intended to limit the present disclosure. For those skilled in the art, the present disclosure may have various modifications and variations. Any modifications, equivalent replacements, improvements and the like made within the spirit and principle of the present disclosure shall fall within the scope of protection of the present disclosure.

What is claimed is:

1. A data transmission method, comprising:
grouping N second-type nodes to form a third-type node, N being a positive integer more than or equal to 2; and
transmitting data in a network comprising the second-type nodes, the third-type node and a first-type node;
wherein grouping the N second-type nodes to form the third-type node comprises: aggregating the N second-type nodes to form the third-type node by taking a component carrier as a unit respectively;
wherein the second-type node comprises: terminal;
wherein the N second-type nodes are autonomously aggregated to form the third-type node, the third-type node is a compound node, the third-type node reports a type of the compound node to the first-type node, and the first-type node performs data scheduling for the type of the compound node, wherein the type of the compound node comprises at least one of: an aggregated node Identity (ID), a compound node type capability indication, an aggregation state and aggregation completion indication information.

2. The method as claimed in claim 1, wherein grouping the N second-type nodes to form the third-type node comprises:
grouping the N second-type nodes to form the third-type node with a multicarrier capability, wherein the N second-type nodes have capabilities of M1, M2, . . . , MN carriers respectively, the third-type node has a capability of less than or equal to M= M1+M2+ . . . +MN carriers, M1, M2, . . . , MN are positive integers more than or equal to 1, and M is a positive integer more than or equal to 2.

3. The method as claimed in claim 2, wherein transmitting the data in the network formed by the second-type nodes, the third-type node and the first-type node comprises:
receiving, by Nr second-type nodes, first data sent through M carriers from one or more first-type nodes; and
forwarding, by the Nr second-type nodes, the first data to Nd second-type nodes in the third-type node,
wherein Nr is a positive integer more than or equal to 1 and less than or equal to N, and Nd is a positive integer more than or equal to 1 and less than or equal to N.

4. The method as claimed in claim 2, wherein transmitting the data in the network formed by the second-type nodes, the third-type node and the first-type node comprises:
sending, by the Nd second-type nodes in the third-type node, second data to the Nr second-type nodes in the third-type node; and
sending, by the Nr second-type nodes, the second data to the one or more first-type nodes through the M carriers,
wherein Nr is a positive integer more than or equal to 1 and less than or equal to N, and Nd is a positive integer more than or equal to 1 and less than or equal to N.

5. The method as claimed in claim 2, wherein transmitting the data in the network formed by the second-type nodes, the third-type node and the first-type node comprises:
receiving, by the Nr second-type nodes with a new-type carrier capability, third data sent through new-type carriers of the M carriers from the one or more first-type nodes; and
forwarding, by the Nr second-type nodes, the third data to the Nd second-type nodes in the third-type node, wherein the Nd second-type nodes do not have the new-type carrier capability,
Nr is a positive integer more than or equal to 1 and less than or equal to N, and Nd is a positive integer more than or equal to 1 and less than or equal to N.

6. The method as claimed in claim 5, wherein
the new-type carriers comprise carriers of an unlicensed frequency band and carriers of a New Carrier Type (NCT).

7. The method as claimed in claim 2, wherein transmitting the data in the network comprising the second-type nodes, the third-type node and the first-type node comprises:
receiving, by the Nr second-type nodes in the third-type node, first control information from the one or more first-type nodes;
forwarding, by the Nr second-type nodes, part or all of the first control information to the Nd second-type nodes in the third-type node;
acquiring, by the Nd second-type nodes, first specified information on the basis of the first control information; and
receiving and sending, by the Nd second-type nodes, service data with the one or more first-type nodes through the M carriers on the basis of the first control information,
wherein Nr is a positive integer more than or equal to 1 and less than or equal to N, and Nd is a positive integer more than or equal to 1 and less than or equal to N.

8. The method according to claim 7, wherein
the Nd second-type nodes have the new-type carrier capability and receive and send the service data with the one or more first-type nodes through the new-type carriers of the M carriers; or
the first control information comprises at least one of the following information: channel scheduling information, data modulation and coding information and channel state information.

9. The method as claimed in claim 2, wherein transmitting the data in the network comprising the second-type nodes, the third-type node and the first-type node comprises:
receiving, by the Nr second-type nodes in the third-type node, second control information from the Nd second-type nodes;
forwarding, by the Nr second-type nodes, part or all of the second control information to the one or more first-type nodes; and
receiving and sending, by the Nd second-type nodes, the service data with the one or more first-type nodes through the M carriers on the basis of the second control information,
wherein Nr is a positive integer more than or equal to 1 and less than or equal to N, and Nd is a positive integer more than or equal to 1 and less than or equal to N.

10. The method as claimed in claim 9, wherein
the Nd second-type nodes have the new-type carrier capability and receive and send the service data with the one or more first-type nodes through the new-type carriers of the M carriers;
or
the second control information comprises at least one of the following information: the channel scheduling information, the data modulation and coding information and the channel state information.

11. The method as claimed in claim 2, wherein transmitting the data in the network formed by the second-type nodes, the third-type node and the first-type node comprises:
receiving, by the Nr second-type nodes, specified-type data sent through the M carriers from the one or more first-type nodes; and
forwarding, by the Nr second-type nodes, the specified-type data to the Nd second-type nodes in the third-type node,
wherein Nr is a positive integer more than or equal to 1 and less than or equal to N, and Nd is a positive integer more than or equal to 1 and less than or equal to N;
wherein the specified-type data comprises at least one of the following information:
Multimedia Broadcast Multicast Service (MBMS) related information, positioning related information and control information.

12. The method as claimed in any one of claim 2, wherein the carrier capability comprises at least one of:
a new-type carrier capability, a Multiple Input Multiple Output (MIMO) layer number, a modulation mode, an interference cancellation capability, a supported carrier number, maximum transmitted power, a Radio Access Technology (RAT) capability and a dual-connectivity/multi-connectivity capability.

13. The method as claimed in claim 1, wherein the first-type node is formed by K nodes, wherein the K nodes are aggregated to form the first-type node by taking a component carrier as a unit respectively, and K is a positive integer more than or equal to 1.

14. The method as claimed in claim 1, wherein the N second-type nodes are aggregated to form the third-type node according to indication information received from the first-type node.

15. The method as claimed in claim 14, after the N second-type nodes are aggregated to form the third-type node according to the indication information received from the first-type node, further comprising:
sending feedback information to the first-type node, wherein the feedback information comprises at least one of: the aggregated node ID, a compound node type capability, the aggregation state and the aggregation completion indication information; and
performing, by the first-type node, data scheduling according to the received feedback information.

16. The method as claimed in claim 2, wherein transmitting the data in the network formed by the second-type nodes, the third-type node and the first-type node comprises:
sending, by the Nd second-type nodes in the third-type node, fourth data to the Nr second-type nodes with the new-type carrier capability in the third-type node; and
sending, by the Nr second-type nodes, the fourth data to the one or more first-type nodes through the new-type carriers of the M carriers, wherein the Nd second-type nodes do not have the new-type carrier capability,
Nr is a positive integer more than or equal to 1 and less than or equal to N, and Nd is a positive integer more than or equal to 1 and less than or equal to N.

17. A data transmission method, comprising:
grouping N second-type nodes are grouped to form a third-type node, N being a positive integer more than or equal to 2; and
performing, by the second-type nodes, data transmission with a first-type node through the third-type node;
wherein grouping the N second-type nodes to form the third-type node comprises: aggregating the N second-type nodes to form the third-type node by taking a component carrier as a unit respectively;
wherein the second-type node comprises: terminal;
wherein the N second-type nodes are autonomously aggregated to form the third-type node, the third-type node is a compound node, the third-type node reports a type of the compound node to the first-type node, and the first-type node performs data scheduling for the type of the compound node, wherein the type of the compound node comprises at least one of: an aggregated node Identity (ID), a compound node type capability indication, an aggregation state and aggregation completion indication information.

18. A data transmission method, comprising:
performing, by a first-type node, data transmission with a second-type node through a third-type node,
wherein the third-type node is formed by N second-type nodes, and N is a positive integer more than or equal to 2;
wherein the third-type node is formed by aggregating the N second-type nodes to form the third-type node by taking a component carrier as a unit respectively;
wherein the second-type node comprises: terminal;
wherein the N second-type nodes are autonomously aggregated to form the third-type node, the third-type node is a compound node, the third-type node reports a type of the compound node to the first-type node, and the first-type node performs data scheduling for the type of the compound node, wherein the type of the compound node comprises at least one of: an aggregated node Identity (ID), a compound node type capability indication, an aggregation state and aggregation completion indication information.

* * * * *